US010853367B1

(12) United States Patent
Miller

(10) Patent No.: US 10,853,367 B1
(45) Date of Patent: Dec. 1, 2020

(54) DYNAMIC PRIORITIZATION OF ATTRIBUTES TO DETERMINE SEARCH SPACE SIZE OF EACH TERM, THEN INDEX ON THOSE SIZES AS ATTRIBUTES

(71) Applicant: Intuit Inc., Mountain View, CA (US)

(72) Inventor: Michael T. Miller, Sarasota, FL (US)

(73) Assignee: Intuit Inc., Mountain View, CA (US)

( * ) Notice: Subject to any disclaimer, the term of this patent is extended or adjusted under 35 U.S.C. 154(b) by 1130 days.

(21) Appl. No.: 15/184,288

(22) Filed: Jun. 16, 2016

(51) Int. Cl.
*G06F 16/24* (2019.01)
*G06F 16/951* (2019.01)
*G06F 16/2453* (2019.01)

(52) U.S. Cl.
CPC ...... *G06F 16/24545* (2019.01); *G06F 16/951* (2019.01)

(58) Field of Classification Search
CPC ......... G06F 16/24545; G06F 16/90335; G06F 16/2453
USPC ....................................................... 707/706
See application file for complete search history.

(56) References Cited

U.S. PATENT DOCUMENTS

| 8,166,021 | B1* | 4/2012 | Cao | G06F 40/289 |
| | | | | 707/713 |
| 8,166,045 | B1* | 4/2012 | Mazumdar | G06F 16/951 |
| | | | | 707/748 |
| 2008/0222087 | A1* | 9/2008 | Balmin | G06F 16/8365 |
| 2012/0310922 | A1* | 12/2012 | Johnson | G06F 16/248 |
| | | | | 707/722 |
| 2013/0173569 | A1* | 7/2013 | Pearcy | G06F 16/9535 |
| | | | | 707/706 |
| 2014/0310249 | A1* | 10/2014 | Kowalski | G06F 16/21 |
| | | | | 707/688 |
| 2016/0253380 | A1* | 9/2016 | Nguyen | G06F 16/2471 |
| | | | | 707/707 |
| 2016/0283551 | A1* | 9/2016 | Fokoue-Nkoutche | ....... |
| | | | | G06F 16/24535 |
| 2016/0371355 | A1* | 12/2016 | Massari | G06F 16/25 |
| 2017/0031967 | A1* | 2/2017 | Chavan | G06F 16/23 |
| 2017/0031976 | A1* | 2/2017 | Chavan | G06F 16/23 |
| 2017/0046217 | A1* | 2/2017 | Shinde | G06F 11/0715 |
| 2017/0160879 | A1* | 6/2017 | Yan | G06F 3/04895 |
| 2018/0067645 | A1* | 3/2018 | Gan | G06F 3/0488 |
| 2018/0173712 | A1* | 6/2018 | Sharma | G06F 16/24542 |
| 2019/0057145 | A1* | 2/2019 | Huang | G06N 20/00 |

* cited by examiner

*Primary Examiner* — Usmaan Saeed
*Assistant Examiner* — David M Nafziger
(74) *Attorney, Agent, or Firm* — Paradice and Li LLP

(57) ABSTRACT

A method and system provides efficient data searches. The method and system include receiving search request data that requests a search to be made and identifying multiple search terms or clauses in the search request data. The method and system includes determining an expected cost in resources for searching each search term. The method and system then searches for each search term in order from least resource intensive to most resource intensive, with each search after the first search being performed only among the results of the previously searched term(s).

29 Claims, 3 Drawing Sheets

__(1)__

DYNAMIC PRIORITIZATION OF ATTRIBUTES TO DETERMINE SEARCH SPACE SIZE OF EACH TERM, THEN INDEX ON THOSE SIZES AS ATTRIBUTES

BACKGROUND

Many businesses, organizations, and individuals rely on data search systems to search databases for desired data. The search results can aid in business development, organizational structuring, marketing, management, and many other important aspects of business management, organizational management, government management, and personal management. However, as the volume and availability of data within databases increases, the amount of system resources needed to perform searches and provide results also increases. Furthermore, when a single search includes multiple search terms or clauses, the strain on system resources can further increase.

For instance, systems that provide data searching services are often strained to efficiently search through vast amounts of data in accordance with the requested search terms. This can result in large delays in obtaining and providing results, or even the failure to provide the most relevant results. This can lead to the necessity of incorporating into search systems ever more resource intensive hardware such as processing devices, storage devices, data transmission devices, etc. Even increased investment in system resources may not be able to meet the ever-growing demand for quick and accurate search results.

When errors or delays in search results occur, there can be serious detrimental consequences both to the search provider system and to the entity that requested the search. For example, organizations and individuals may make decisions based on incomplete or faulty data due to inadequacies in the search. These individuals may suffer adverse consequences as a result these decisions. Furthermore, organizations and individuals may lose confidence in the search system.

What is needed is a method and system for providing accurate search results while reducing the strain on system resources.

SUMMARY

Embodiments of the present disclosure address some of the shortcomings associated with traditional search systems by providing methods and systems for providing efficient data searches. Embodiments of the present disclosure identify the expected drain on system resources that each individual term or clause of a multi-clause search will require. Individual search terms are then searched in order from least resource intensive to most resource intensive. Each search term after the least resource intensive search term is searched only within the results of the previous search terms. This vastly reducing the resources expended in searching the later search terms of the multi-clause search.

In one embodiment, a search management system maintains a search cost database that catalogs the cost in system resources to search various terms. When a new search is requested, the search management system identifies the various terms or clauses contained in the new search, matches the search terms to search terms catalogued in the search cost database, and determines the cost in system resources to search each term or clause of the new search. The search management system then determines an order in which the terms of the new search will be searched. In particular, the search management system determines that search terms will be searched in order from least resource intensive to most resource intensive. Furthermore, after the first term is searched, the second term is searched only within the results from the first search. Thus, more resource intensive search terms will only be searched within the relatively small set of results obtained from searching the less resource intensive search terms. This greatly reduces the strain on the system to conduct multi-clause searches. In this way, embodiments of the present disclosure provide methods and systems for providing efficient data searches.

In one embodiment, the search management system updates the search cost database based on the search results for the least resource intensive search term. In this way, the search management system dynamically and continually improves the search cost database. This helps to ensure continued improvements in accuracy and efficiency of search results obtained by the search management system.

In one embodiment, the search term cost data indicates an expected size of the set of search results for respective search terms based on previously performed searches. Thus, search terms that are expected to return the fewest number results are searched first. Search terms that are expected to return the largest number results are searched last and only within the results of the searches of the previous terms.

In one embodiment, the search term cost data indicates the amount of time required to perform a search for each known search term. For a given search request, the search management system will first search the individual terms in order from smallest expected completion time to largest expected completion time. Each term will be searched only within the set of results from the previously search terms.

In one embodiment the search term cost data indicates expected processing resources, data transmission resources, memory resources, or other computing system resources that may be utilized in completing the data search.

A search management system in accordance with one or more embodiments provides more efficient searches than in traditional systems by determining the expected cost of searching the various terms of a search request and prioritizing the order in which the search terms will be searched from least resource intensive to most resource intensive and searching the most resource intensive search terms only within the subset of search results from the less resource intensive search terms. The various embodiments of the disclosure can be implemented to improve the technical fields of data collection, data processing, user experience, and services marketing. Therefore, the various described embodiments of the disclosure and their associated benefits amount to significantly more than an abstract idea. In particular, by prioritizing search term order from least resource intensive to most resource intensive, system resources can be conserved and searches can be performed more accurately and quickly.

Using the disclosed embodiments of a method and system for providing efficient data searches, a method and system for performing data searches more accurately and efficiently is provided. Therefore, the disclosed embodiments provide a technical solution to the long standing technical problems of reducing the burden on system processors, memory, servers, and communication channels.

In addition, the disclosed embodiments of a method and system for efficient data searches are also capable of dynamically adapting as additional searches are performed. Consequently, the disclosed embodiments of a method and system for providing efficient data searches also provide a technical solution to the long standing technical problem of static and inflexible search management systems.

The result is a much more accurate, adaptable, and robust, method and system for efficient searches, but thereby serves to bolster confidence in electronic financial systems. This, in turn, results in: less human and processor resources being dedicated to performing searches because more accurate and efficient search methods can be implemented, i.e., fewer processing and memory storage assets; less memory and storage bandwidth and communication bandwidth being dedicated to performing searches.

The disclosed method and system for providing efficient searches does not encompass, embody, or preclude other forms of innovation in the area of data searches. In addition, the disclosed method and system for providing efficient data searches is not related to any fundamental economic practice, fundamental data processing practice, mental steps, or pen and paper based solutions, and is, in fact, directed to providing solutions to new and existing problems associated with resource intensive data searches. Consequently, the disclosed method and system for providing efficient data searches, does not encompass, and is not merely, an abstract idea or concept.

Figure 1:
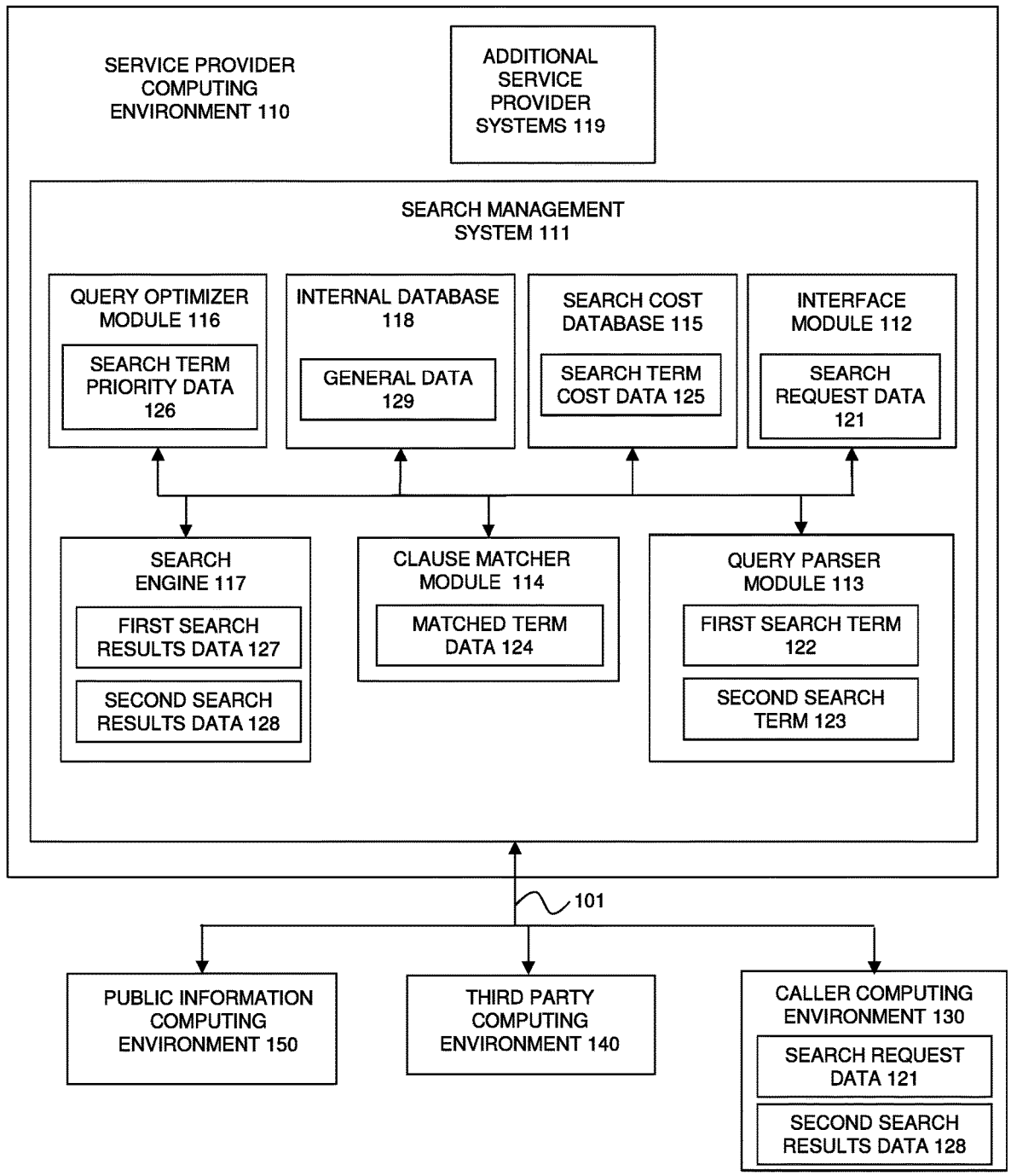
FIG. 1 is a block diagram of software architecture for providing efficient data searches, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed form-fill assistance system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

Hardware Architecture

FIG. 1 illustrates a block diagram of a production environment 100 for providing efficient data searches, according to one embodiment. Embodiments of the present disclosure provide methods and systems for providing efficient data searches, according to one embodiment. In particular, embodiments of the present disclosure maintain a search cost database that includes search term cost data indicating the cost in system resources to perform a search for a given search term. When a new search is requested, embodiments of the present disclosure parse the search request data to identify search terms and refer to the search cost database to determine which search term requires the fewest resources to search. Embodiments of the present disclosure then perform a first search for the least resource intensive term. A second search for the next least resource intensive term is then performed only within the results of the first search. If there are more than two terms within the search request data, then subsequent searches are performed for remaining terms in the order of least cost until the final term has been searched. When the final term has been searched the final search results are provided to the entity that made the initial search request. By performing searches for the search terms in order from least resource intensive to most resource intensive, fewer system resources are used in completing the initial search request.

In addition, the disclosed method and system for providing efficient data searches provides for significant improvements to the technical fields of electronic transaction data processing, data processing, data management, and user experience.

In addition, as discussed above, the disclosed method and system for providing efficient data searches provides for the processing and storing of smaller amounts of data, i.e., by performing more resource intensive searches only within the results obtained from less resource intensive searches. Consequently, using the disclosed method and system for providing efficient data searches results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for providing efficient data searches.

The production environment 100 includes a service provider computing environment 110, a caller computing environment 130, a third party computing environment 140, and a public information computing environment 150 for providing efficient data searches, according to one embodiment. The computing environments 110, 130, 140, and 150 are communicatively coupled to each other with one or more communication channels 101, according to one embodiment.

The service provider computing environment 110 represents one or more computing systems such as a server, a computing cabinet, and/or distribution center that is configured to receive, execute, and host one or more search management systems, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes a search management system 111, which is configured to provide efficient data searches.

According to an embodiment, the search management system 111 receives, from a caller, search request data requesting that a data search be performed for one or more clauses or terms indicated in the search request data. The search management system 111 parses the search request data to identify the individual terms or clauses requested to be searched. The search management system 111 refers to a search cost database to identify the expected cost in system resources to search each respective term included in the search request data. The search management system 111 then determines an order in which the search terms should be searched, beginning with the least resource intensive search term and continuing with the next least resource intensive search term and so forth until the most research intensive search term. The search management system 111 then performs a first search for the least resource intensive search term. The search management system 111 then performs a second search for the next least resource intensive search term only within the results of the first search. The search management system 111 continues searching each additional search term only within the results of the previous search terms until all search terms have been searched. The system then returns the final search results to the caller. In this way search terms that would otherwise utilize a large amount of system resources are searched only within the smaller subset of results of a less resource intensive search term. This can substantially reduce the strain put upon system resources in performing searches with multiple search terms.

According to an embodiment, after providing the search results to the caller, the system dynamically updates the search cost database based on the first search. In this way, each time the search management system 111 executes a requested data search, the search management system 111 improves the accuracy of the search cost database. The result is that the search management system 111 can provide improving levels of efficiency in data searches.

According to an embodiment, the search term cost data indicates a size of the set of search results for respective search terms. Thus, search terms that are expected to return the fewest number of results are searched first. Search terms that are expected to return the largest number of results are searched last and only within the results of the searches of the previous terms.

According to an embodiment, the search term cost data indicates the amount of time required to perform a search for each known search term. For a given search request, the search management system 111 will first search the individual terms in order from smallest expected completion time to largest expected completion time. Each term will be searched only within the set of results from the previously search terms.

According to one embodiment the search term cost data indicates expected processing resources, data transmission resources, memory resources, or other computing system resources that may be utilized in completing the data search.

The search management system 111 includes an interface module 112, a query parser module 113, a clause matcher module 114, and a search cost database 115. The search management system 111 further includes a query optimizer module 116, a search engine 117, and an internal database 118.

The interface module 112 enables a caller to request that the search management system 111 perform a search. The caller can include one or more computer programs or applications associated with the service provider computing environment 110. Additionally or alternatively, the caller can include one or more computer programs or applications and associated with the service provider computing environment 110. Additionally or alternatively, the caller can include one or more humans utilizing one or more computer systems to request that the search management system 111 perform a search. The caller can include a technician associated with the service provider computing environment 110 or a user of one or more systems provided in conjunction with the service provider computing environment 110.

The interface module 112 provides utilities that allow a caller to access the search management system 111, to communicate with the search management system 111, and to input search request data 121 indicating the terms or clauses to be included in the requested search. The utilities can include hardware and software resources that enable communication with the search management system 111.

The user interface module 112 receives search request data 121 from a caller. The search request data 121 indicates a request for the search management system 111 to perform a search for selected terms or clauses included within the search request data 121. The interface module 112 processes the search request data and passes the search request data to the query parser module 113.

The query parser module 113 receives the search request data 121 from the interface module 112. The query parser module 113 parses the search request data 121 and identifies a first search term 122 and a second search term 123. The query parser module 113 can analyze the search request data to determine whether the search request data 121 indicates that the search should return only results that include both the first search term 122 and the second search term 123. If the query parser module 113 determines that the search request data 121 indicates a desire to return results that include both the first search term 122 and the second search term 123, then the query parser module 113 passes the first search term 122 and the second search term 123 to the clause matcher module 114.

The clause matcher module 114 receives the first search term 122 and the second search term 123 from the query parser module 113 and analyzes the first search term 122 and the second search term 123. The clause matcher module 114 matches the first search term 122 to a known search term. The clause matcher module 114 matches the second search term 123 to another known search term. The reason that the clause matcher module 114 matches the first and second search terms 122, 123 to known search terms is because the first and second search terms 122, 123 may use slightly different spelling or terminology than previously searched terms, but may nevertheless be requesting the same thing as one or more previously searched terms. For example, a previous search request may have included the name Los Angeles, but a current search term includes the abbreviation L.A. The clause matcher module 114 can determine from context that the current search term L.A. refers to the city of Los Angeles. Accordingly, the query optimizer module 116 can match the term L.A. to the known search term Los Angeles. The clause matcher module 114 generates matched term data 124 that indicates terms from the search cost database 115 to which the first search term 122 and the second search term 123 are matched.

The search cost database 115 is a database that stores data related to previously performed searches. In particular, the search cost database 115 includes a database of search term cost data 125. The search term cost data 125 provides an indication of system resources that were expended in previous searches for a large number of catalogued search terms. The search management system 111 has performed a large number of requested searches related to a large number of historical search terms. Each time the search management system 111 performs a search, the search management system 111 records in the search cost database 115 an indication of system resources expended in completing the various searches. The search term cost data 125 records in a searchable manner, each of the search terms and the resources expended in completing the searches for the respective search terms. The search term cost data 125 can include for each catalogued search term an average of resources expended for a plurality of searches, resource expenditure data related only to the most recent search, or data related to some or all of the searches performed.

According to an embodiment, the search term cost data 125 indicates a size of the set of search results for each catalogued search term. According to an embodiment, the search term cost data 125 indicates the amount of time required to perform the search for each catalogued search term. According to one embodiment the search term cost data 125 indicates expected processing resources, data transmission resources, memory resources, or other computing system resources that may be utilized in completing a search for each catalogued search term.

The clause matcher module 114 matches the first search term 122 and the second search term 123 to one or more search terms catalogued in the search term cost data 125. The clause matcher module 114 passes the matched term data 124 to the query optimizer module 116.

The query optimizer module 116 accesses the search cost database 115 in order to retrieve search term cost data related to the first search term 122 and the second search term 123 based on the matched term data 124. The query optimizer module 116 generates search term priority data 126 based on the search term cost data 125 related to the first search term 122 and the second search term 123.

The search term priority data 126 indicates an order in which the first search term 122 and the second search term 123 should be searched. In particular, the query optimizer module 116 sets an order for searching the terms of the search request data 121 in order from least cost intensive to most cost intensive. If the search cost database 115 indicates that the first search term 122 is less resource intensive than the second search term 123, then the query optimizer module 116 will generate search term priority data 126 that indicates that the first search term 122 should be searched before the second search term 123. The query optimizer 116 passes the search term priority data 126 to the search engine 117.

The search engine 117 receives the search term priority data 126 from the query optimizer module 116. The search engine 117 then performs a search for each search term represented by the search request data 121 in an order based on the search term priority data 126. Thus, if the search term priority data 126 indicates that the first search term 122 should be searched first, followed by the second search term 123, then the search engine 117 will perform a first search for the first search term 122 and then perform a second search for the second search term 123. When the search engine 117 performs the first search, the search engine 117 generates first search results data 127. The first search results data 127 is a result of the first search for the first search term 122, in this example. In particular, the first search results data 127 include search results that are relevant to the first search term 122. The search engine 117 then performs a second search for the second search term 123. The second search is performed only within the first search results data 127. The search engine 117 generates second search results data 128. Because the second search results data 128 is generated from a search within only the first search results data 127, the second search results data 128 will return the results that are relevant to both the first search term 122 and the second search term 123. The second search results data 128 represent the full search results for the search request data 121, in a case in which the search request data 121 includes only the first search term 122 and the second search term 123.

The prioritized search performed by the search engine 117 in accordance with principles of the present disclosure results in a more efficient search than in typical systems. This is because instead of performing the more resource intensive search for the second search term on all available data, the second search term 123 is searched only within the smaller data subset of the first search results data 127. This frees up valuable system resources enabling better performance of the search management system 111. Furthermore, search results are returned more quickly In one embodiment, the search engine 117 performs this series of searches on data stored in the internal database 118. The internal database 118 stores general data 129. The general data 129 can include all or portion of the data stored by the search management system 111 from which search results will be obtained. The internal database 118 can include multiple individual databases stored in multiple different locations or at a single location.

In one embodiment, the search engine 117 is configured to search among various sources to obtain the first search result data 127, according to one embodiment. For example, the search engine 117 is configured to communicate with additional service provider systems 119, according to one embodiment. The search engine 117 imports relevant into the first search results data 127 and, for example, saves local copies into one or more databases, according to one embodiment.

In one embodiment, the search engine 117 is configured search among the public information computing environment 150. The first search results data 127 can be gathered from public record searches of tax records, public information databases, property ownership records, and other public sources of information. The search engine 117 can also acquire data from sources such as social media websites, such as Twitter, Facebook, LinkedIn, and the like.

The search engine 117 is configured to acquire data from third parties, according to one embodiment. For example, the search engine 117 requests and receives third party data from the third party computing environment 140, according to one embodiment. In one embodiment, the third party computing environment 140 is configured to automatically transmit data to the search management system 111 (e.g., to the search engine 117), to be included in the first search results data 127. The third party computing environment 140 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In one example, the caller computing environment 130 provides search request data 121 to search management system 111. The search request data 121 states "how many business in Santa Clara county use a payroll application?". The interface module 112 receives the search request data 121 from the caller computing environment 130. The interface module 112 passes the search request data 121 to the query parser module 113. The query parser module 113 analyzes the search request data 121 and determines that the search request data 121 includes two search terms or clauses; business with payroll applications and business in Santa Clara county. Furthermore, the query parser module 113 determines that the search request data 121 is requesting search results that satisfy both search terms. i.e. businesses that are both in Santa Clara and have payroll applications. The query parser module 113 identifies the first search term 122 and the second search term 123 and passes them to the clause matcher module 114.

The clause matcher module 114 receives the first search term 122, in this case businesses in Santa Clara, and the second search term 123, in this case businesses with payroll applications. The clause matcher module 114 matches the first term 122 and the second term 123 to catalogued search terms included in the search term cost data 125. In particular, the clause matcher module 114 analyzes the search cost database 115 in order to match the first search term 122 and the second search term 123 to terms in the search term cost data 125. The clause matcher module 124 generates matched term data 124 indicating the terms to which the first search term 122 and the second search term 123 are matched. The clause matcher module 114 passes the matched term data to the query optimizer module 116.

The query optimizer module 116 receives the matched term data 124 from the clause matcher module 114. The query optimizer module 116 analyzes the search term cost data 125 in the search cost database 115 in order to determine the cost or burden on the search management system 111 that will be required to search both the first search term 122 and the second search term 123. In this case, the query optimizer module 116 searches the search term cost data 125 in order to determine the expected number of search results for searching the first search term 122, businesses in Santa Clara, and the second search term 123, businesses with payroll applications. The search cost database 115 indicates that the expected number of results for searching businesses in Santa Clara is 250. The search cost database 115 indicates that the expected number of results for searching businesses with payroll applications is 100,000. Thus, the query optimizer 116 determines that searching for businesses with payroll applications will be much more resource intensive than searching for businesses in Santa Clara. Accordingly, the query optimizer module 116 generates the search term priority data 126. The search term priority data 126 indicates an order in which the first search term 122 and the second search term 123 should be searched. In this case, because searching the first search term 122 is expected to return far fewer results than searching the second search term 123, the query optimizer module 116 indicates that the first search term 122 should be searched first and that the second search term 123 should only be searched among the results of the search for the first search term 122. The query optimizer module 116 passes the search term priority data 126 to the search engine 117.

The search engine 117 receives the search term priority data 126 from the query optimizer module 116. The search engine 117 performs a search for businesses in Santa Clara. In particular, the search engine 117 searches one or more of the internal database 118, the public information computing environment 150, the third party computing environment 140, and the additional service provider systems 119 for businesses in Santa Clara. The search engine 117 generates first search results data 127 including businesses in Santa Clara. The search engine 117 then performs a second search among the first search results data 127. In particular, the search engine 117 searches among the first search results data 127 for businesses with payroll applications. The search engine 117 generates second search results data 128 from the second search. The second search results data 128 include a list of businesses in Santa Clara with payroll applications. Accordingly, the second search results data 128 correspond to the final search results for the search requested data 121. The search engine 117 provides the second search results data 127 to the interface module 112. The interface module 112 provides the second search results data 128 to the caller computing environment 130.

In one embodiment, the search management system 111 updates the search cost database 115 based on the first search results data 127. In particular, the search management system 111 updates the search term cost data 125 to reflect the number of results returned in the search for surgeons. In one embodiment, the search management system 111 does not update the search term cost data 125 based on the second search results data 128 because those search results were obtained only from a smaller subset of the first search results data 127.

In the example above, the search engine 117 has performed a more resource efficient search. This is because rather than searching among all the data for businesses with payroll applications, the search engine 117 searches for businesses with payroll applications only among the pool of businesses in Santa Clara. Thus, the prioritized search enabled by the search management system 111 conserves system resources and provides search results more quickly.

Furthermore the search management system 111 dynamically updates itself each time that a search is executed in accordance with newly received search request data 121.

In one embodiment, the search management system 111 is part of a financial system that assists customers in managing one or more aspects of their finances. The financial system can include a tax return preparation system, a financial management system, a system that manages one or more of investments, savings, retirement plans, loans, bills, payroll, checking, spending, trusts, transactions, or any other financial matters. Such financial systems often provide personalized services to their customers. These personalized services can include analyzing large amounts of data to find similarities or shared personal characteristics among customers and/or the general public at large. This often includes categorizing data. Categories in the data includes searching to vast amounts of financial data retrieved from customers themselves, from internal databases 118, or from public information computing environments 150 or third-party computing environments 140. The search management system 111 can greatly improve the efficiency of such categorization and analysis by efficiently executing requested searches by first prioritizing the search terms based on expected required resources to perform searches and then by searching the lease resource intensive terms first and searching the more resource intensive terms only from among the results of the previous less resource intensive searches. In this way, the search management system 111 provides improved efficiency over previous systems.

In one embodiment, the clause matching module 114 may be able to match one term from the search request data 121 to a catalogued term in the search term cost data 125 while being unable to match a second term from the search request data 121 to a catalog determine the search term cost data 125. In this case, the query optimizer module 116 can search the search term cost data 125 to determine the cost for searching the known search term. If the cost for searching the known search term is above a selected threshold, then the query optimizer 116 can determine that it is more likely that the second search term will be less resource intensive and can prioritize the second search term over the known search term. If the cost for searching the known search term is below the selected threshold, then the query optimizer 116 can determine that it is unlikely that the unknown search term is less resource intensive than the known search term and the query optimizer 116 can prioritize the known search term over the unknown search term. In this way, the query optimizer module 116 can take a probabilistic approach to prioritizing the search terms.

In one embodiment, if the clause matching module 114 cannot match one of the search terms from the search request data 121 to a catalogued search term in the search term cost data 125, then the clause matching module 114 can determine a catalog search term that is likely to require a similar number of resources as the unmatched search term. The query optimizer module 116 can then prioritize the search terms based on imperfectly matched search terms from the search term cost data 125 in the case where a reliable match is not found by the clause manager module 114.

Previous examples have primarily focused on cases in which the search request data 121 includes two search terms. However, the search management system 111 can provide efficient searching for search request data 121 that includes three or more search terms. The query parser module 113 analyzes the search request data 121 and identifies three or more search terms. The clause manager module 114 matches each of the three or more search terms to a catalogued search term in the search term cost data 125 of the search cost database 115. The query optimizer module 116 generates search term priority data 126 that indicates an order in which the three or more search terms should be searched. In particular, the search term priority data 126 indicates that the three or more search terms should be searched in order of least resource intensive to most resource intensive. The search engine 117 then searches the expected least resource intensive search term first and generates first search results. The search engine 117 then searches the second least resource intensive search term within the results of the first search. The search engine 117 then searches the third least resource intensive search term within the results of the second search. The search engine 117 continues in this manner until the most resource intensive search term has been searched within the results of all the previous searches.

While FIG. 1 discloses that the various modules of the search management system 111 are associated with a service provider computing environment 110 that is separate from the caller computing environment 130, in practice, the caller computing environment 130 can be part of the service provider computing environment and more particularly, part of the search management system 111.

Embodiments of the present disclosure address some of the shortcomings associated with traditional search management systems that do not perform efficient searches. A financial system in accordance with one or more embodiments provides more efficient use of system resources in performing searches. The various embodiments of the disclosure can be implemented to improve the technical fields of user experience, services marketing, data collection, and data processing. Therefore, the various described embodiments of the disclosure and their associated benefits amount to significantly more than an abstract idea. In particular, by prioritizing search terms based on expected use of system resources, system resources are used more efficiently.

Process

Figure 2:
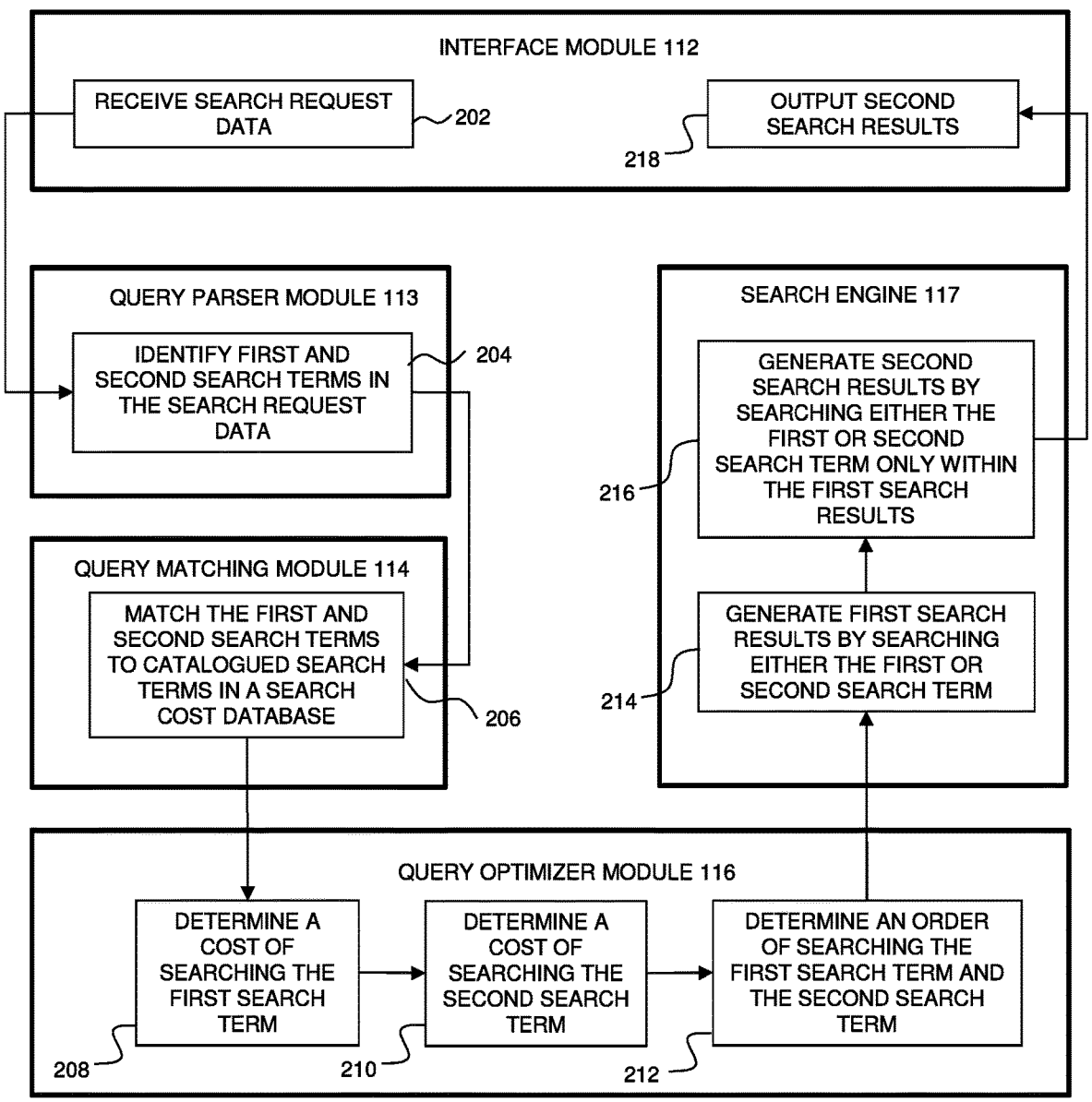
FIG. 2 is a block diagram of a process for providing efficient data searches, in accordance with one embodiment.

FIG. 2 illustrates a functional flow diagram of a process 200 for providing efficient data searches, in accordance with one embodiment.

At block 202, the interface module 112 receives search request data relating to a request to perform a search, according to one embodiment. From block 202 the process proceeds to block 204.

At block 204, the query parser module 113 identifies first and second search terms in the search request data, according to one embodiment. From block 204 the process proceeds to block 206.

At block 206 the query matching module 114 matches the first and second search terms to catalogued search terms in a search cost database, according to one embodiment. From block 206 the process proceeds to block 208.

At block 208 the query optimizer module 116 determines a cost of searching the first search term based on the search cost database, according to one embodiment. From block 208 the process proceeds to block 210.

At block 210, the query optimizer module 116 determines the cost of searching the second search term based on the search cost database, according to one embodiment. From block 210 the process proceeds to block 212.

At block 212, the query optimizer module 116 determines an order of searching the first search term and the second search term based on the relative costs of searching the first search term and the second search term, according to one embodiment. From block 212 the process proceeds to block 214.

At block 214 the search engine 117 generates first search results by searching the first or second search term based on the order determined by the query optimizer module 116, according to one embodiment. From block 214 the process proceeds to block 216.

At block 216 the search engine 117 generates second search results by searching either the first or second search term only within the first search results based on the order determined by the query optimizer module 116, according to one embodiment. From block 216 the process proceeds to block 218.

At block 218 the interface module 112 outputs the second search results, according to one embodiment.

Although a particular sequence is described herein for the execution of the process 200, other sequences and steps can also be implemented.

Figure 3:
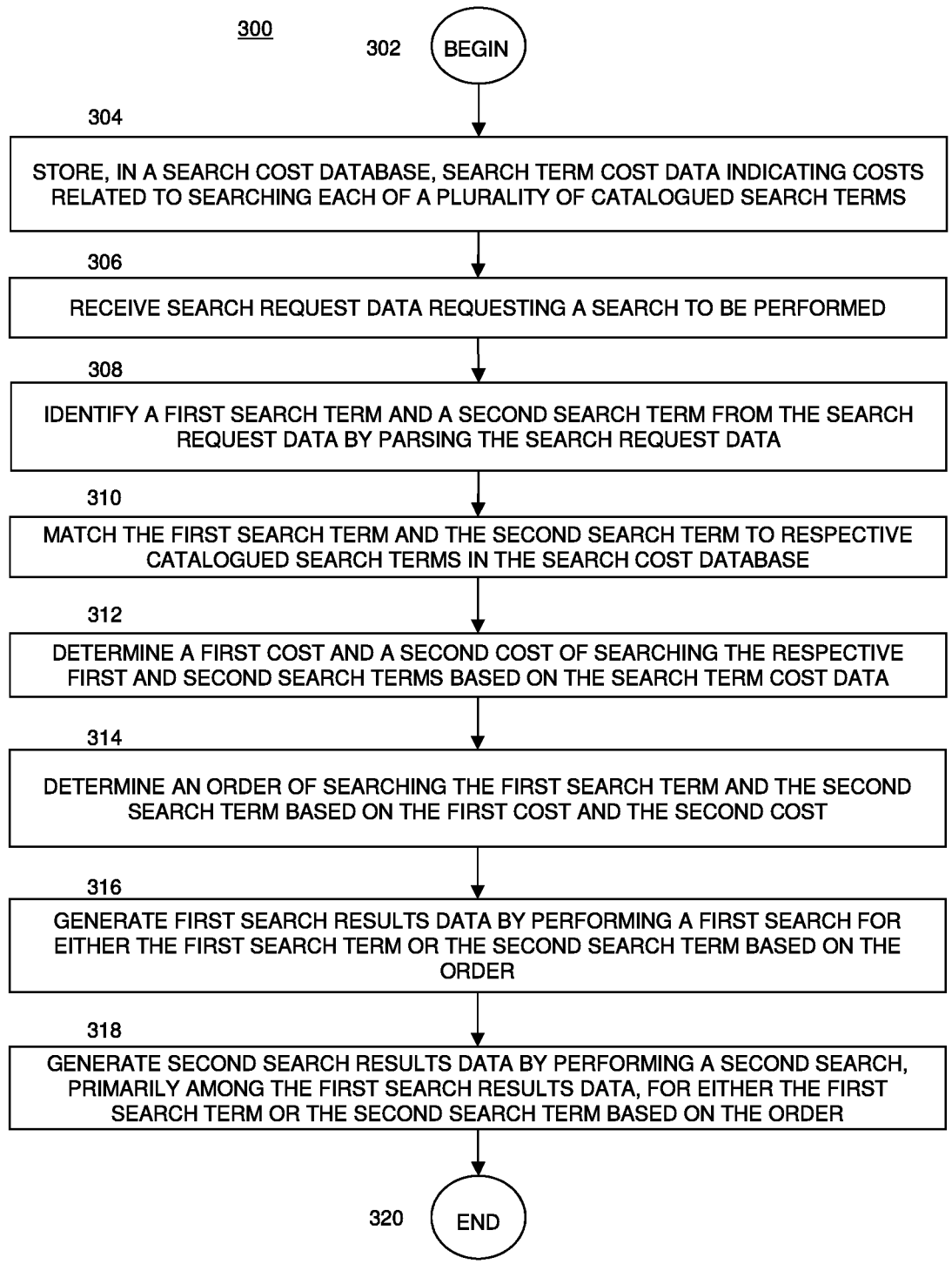
FIG. 3 is a flow diagram of a process for providing efficient data searches, in accordance with one embodiment.

FIG. 3 illustrates a flow diagram of a process 300 for providing efficient data searches, according to various embodiments.

In one embodiment, process 300 for providing efficient data searches begins at BEGIN 302 and process flow proceeds to STORE, IN A SEARCH COST DATABASE, SEARCH TERM COST DATA INDICATING COSTS RELATED TO SEARCHING EACH OF A PLURALITY OF CATALOGUED SEARCH TERMS 304.

In one embodiment, at STORE, IN A SEARCH COST DATABASE, SEARCH TERM COST DATA INDICATING COSTS RELATED TO SEARCHING EACH OF A PLURALITY OF CATALOGUED SEARCH TERMS 304 process 300 for providing efficient data searches stores, in a search cost database, search term cost data indicating costs related to searching each of a plurality of catalogued search terms.

In one embodiment, once process 300 for providing efficient data searches stores, in a search cost database, search term cost data indicating costs related to searching each of a plurality of catalogued search terms at STORE, IN A SEARCH COST DATABASE, SEARCH TERM COST DATA INDICATING COSTS RELATED TO SEARCHING EACH OF A PLURALITY OF CATALOGUED SEARCH TERMS 304 process flow proceeds to RECEIVE SEARCH REQUEST DATA REQUESTING A SEARCH TO BE PERFORMED 306.

In one embodiment, at RECEIVE SEARCH REQUEST DATA REQUESTING A SEARCH TO BE PERFORMED 306, process 300 for providing efficient data searches receives search request data requesting a search to be performed.

In one embodiment, once process 300 for providing efficient data searches receives search request data requesting a search to be performed at RECEIVE SEARCH REQUEST DATA REQUESTING A SEARCH TO BE PERFORMED 306, process flow proceeds to IDENTIFY A FIRST SEARCH TERM AND A SECOND SEARCH TERM FROM THE SEARCH REQUEST DATA BY PARSING THE SEARCH REQUEST DATA 308.

In one embodiment, at IDENTIFY A FIRST SEARCH TERM AND A SECOND SEARCH TERM FROM THE SEARCH REQUEST DATA BY PARSING THE SEARCH REQUEST DATA 308, process 300 for providing efficient data searches identifies a first search term and a second search term from the search request data by parsing the search request data, according to one embodiment.

In one embodiment, once process 300 for providing efficient data searches identifies a first search term and a second search term from the search request data by parsing the search request data at IDENTIFY A FIRST SEARCH TERM AND A SECOND SEARCH TERM FROM THE SEARCH REQUEST DATA BY PARSING THE SEARCH REQUEST DATA 308, process flow proceeds to MATCH THE FIRST SEARCH TERM AND THE SECOND SEARCH TERM TO RESPECTIVE CATALOGUED SEARCH TERMS IN THE SEARCH COST DATABASE 310.

In one embodiment, at MATCH THE FIRST SEARCH TERM AND THE SECOND SEARCH TERM TO RESPECTIVE CATALOGUED SEARCH TERMS IN THE SEARCH COST DATABASE 310 the process 300 matches the first search term and the second search term to respective catalogued search terms in the search cost database.

In one embodiment, once process 300 matches the first search term and the second search term to respective catalogued search terms in the search cost database at MATCH THE FIRST SEARCH TERM AND THE SECOND SEARCH TERM TO RESPECTIVE CATALOGUED SEARCH TERMS IN THE SEARCH COST DATABASE 310, process flow proceeds to DETERMINE A FIRST COST AND A SECOND COST OF SEARCHING THE RESPECTIVE FIRST AND SECOND SEARCH TERMS BASED ON THE SEARCH TERM COST DATA 312.

In one embodiment, at DETERMINE A FIRST COST AND A SECOND COST OF SEARCHING THE RESPECTIVE FIRST AND SECOND SEARCH TERMS BASED ON THE SEARCH TERM COST DATA 312 the process 300 for providing efficient data searches determines a first cost and a second cost of searching the respective first and second search terms based on the search term cost data.

In one embodiment, once the process 300 for providing efficient data searches determines a first cost and a second cost of searching the respective first and second search terms based on the search term cost data at DETERMINE A FIRST COST AND A SECOND COST OF SEARCHING THE RESPECTIVE FIRST AND SECOND SEARCH TERMS BASED ON THE SEARCH TERM COST DATA 312, process flow proceeds to DETERMINE AN ORDER OF SEARCHING THE FIRST SEARCH TERM AND THE SECOND SEARCH TERM BASED ON THE FIRST COST AND THE SECOND COST 314.

In one embodiment, at DETERMINE AN ORDER OF SEARCHING THE FIRST SEARCH TERM AND THE SECOND SEARCH TERM BASED ON THE FIRST COST AND THE SECOND COST 314 the process 300 for providing efficient data searches determines an order of searching the first search term and the second search term based on the first cost and the second cost.

In one embodiment, once the process 300 for providing efficient data searches determines an order of searching the first search term and the second search term based on the first cost and the second cost at DETERMINE AN ORDER OF SEARCHING THE FIRST SEARCH TERM AND THE SECOND SEARCH TERM BASED ON THE FIRST COST AND THE SECOND COST 314, process flow proceeds to GENERATE FIRST SEARCH RESULTS DATA BY PERFORMING A FIRST SEARCH FOR EITHER THE FIRST SEARCH TERM OR THE SECOND SEARCH TERM BASED ON THE ORDER 316.

In one embodiment, at GENERATE FIRST SEARCH RESULTS DATA BY PERFORMING A FIRST SEARCH FOR EITHER THE FIRST SEARCH TERM OR THE SECOND SEARCH TERM BASED ON THE ORDER 316 the process 300 for providing efficient data searches generates first search results data by performing a first search for either the first search term or the second search term based on the order.

In one embodiment, once the process 300 for providing efficient data searches generates first search results data by performing a first search for either the first search term or the second search term based on the order at GENERATE FIRST SEARCH RESULTS DATA BY PERFORMING A FIRST SEARCH FOR EITHER THE FIRST SEARCH TERM OR THE SECOND SEARCH TERM BASED ON THE ORDER 316, process flow proceeds to GENERATE SECOND SEARCH RESULTS DATA BY PERFORMING A SECOND SEARCH, PRIMARILY AMONG THE FIRST SEARCH RESULTS DATA, FOR EITHER THE FIRST SEARCH TERM OR THE SECOND SEARCH TERM BASED ON THE ORDER 318.

In one embodiment, at GENERATE SECOND SEARCH RESULTS DATA BY PERFORMING A SECOND SEARCH, PRIMARILY AMONG THE FIRST SEARCH RESULTS DATA, FOR EITHER THE FIRST SEARCH TERM OR THE SECOND SEARCH TERM BASED ON THE ORDER 318 the process 300 for providing efficient data searches generates second search results data by performing a second search, primarily among the first search results data, for either the first search term or the second search term based on the order.

In one embodiment, once the process 300 for providing efficient data searches generates second search results data by performing a second search, primarily among the first search results data, for either the first search term or the second search term based on the order at GENERATE SECOND SEARCH RESULTS DATA BY PERFORMING A SECOND SEARCH, PRIMARILY AMONG THE FIRST SEARCH RESULTS DATA, FOR EITHER THE FIRST SEARCH TERM OR THE SECOND SEARCH TERM BASED ON THE ORDER 318, process flow proceeds to END 320.

In one embodiment, at END 320 the process for providing efficient data searches is exited to await new data and/or instructions. As noted above, the specific illustrative examples discussed above are but illustrative examples of implementations of embodiments of the method or process for providing efficient data searches data to a user. Those of skill in the art will readily recognize that other implementations and embodiments are possible. Therefore the discussion above should not be construed as a limitation on the claims provided below.

In one embodiment, a system provides efficient data searches. The system includes at least one processor and at least one memory coupled to the at least one processor. the at least one memory having stored therein instructions which, when executed by any set of the one or more processors, perform a process. The process includes storing, in a search cost database of a computing system, search term cost data indicating costs related to searching each of a plurality of catalogued search terms. The process also includes receiving, in an interface module of a computing system, search request data requesting a search to be performed and identifying, with a query parser module of a computing system, a first search term and a second search term from the search request data by parsing the search request data. The process also includes matching, with a query matching module of a computing system, the first search term and the second search term to respective terms in the search cost database. The process also includes determining, with a query optimizer module of a computing system, a first cost of searching the first search term based on the search term cost data and determining, with the query optimizer module, a second cost of searching the second search term based on the search term cost data. The process also includes determining, with the query optimizer module, an order of searching the first search term and the second search term based on the first cost and the second cost and generating, with a search engine of a computing system, first search results by performing a first search for either the first search term or the second search term based on the order. The process also includes generating, with the search engine, second search results by performing a second search, primarily among the first search results, for either the first search term or the second search term based on the order.

In one embodiment, a method provides efficient data searches. The method includes storing, in a search cost database, search term cost data indicating costs related to searching each of a plurality of catalogued search terms. The method further includes receiving search request data requesting a search to be performed and identifying a first search term and a second search term from the search request data by parsing the search request data. The method further includes matching the first search term and the second search term to respective catalogued search terms in the search cost database. The method further includes determining a first cost of searching the first search term based on the search term cost data and determining a second cost of searching the second search term based on the search term cost data. The method further includes determining an order of searching the first search term and the second search term based on the first cost and the second cost. The method further includes generating first search results by performing a first search for either the first search term or the second search term based on the order and generating second search results by performing a second search, primarily among the first search results, for either the first search term or the second search term based on the order.

In one embodiment, a non-transitory computer-readable medium includes a plurality of computer-executable instructions which, when executed by a processor, perform a method for providing efficient data searches. The instructions include a search cost database that stores search term cost data indicating costs related to searching each of a plurality of catalogued search terms. The instructions further include an interface module configured to receive request data requesting a search to be performed and a query parser module configured to identify a first search term and a second search term from the search request data by parsing the search request data. The instructions further include a query matching module configured to match the first search term and the second search term to respective catalogued search terms in the search cost database. The instructions further include a query optimizer module configured to determine a first cost of searching the first search term based on the search term cost data, to determine a second cost of searching the second search term based on the search term cost data, and to determine an order of searching the first search term and the second search term based on the first cost and the second cost. The instructions further include a search configured to generate first search results data by performing a first search for either the first search term or the second search term based on the order, and to generate second search results data by performing a second search, primarily among the first search results data, for either the first search term or the second search term based on the order.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a system, the method comprising:
   receiving a search request from a system user;
   identifying a plurality of search terms from the search request;
   retrieving search cost data indicating a respective search cost for each respective search term of the plurality of search terms based on a plurality of known search terms;
   matching each respective search term to a respective one of the plurality of known search terms;

determining, for each respective search term, a search cost of searching the respective search term, based on the matching;

determining an efficient order of searching the plurality of search terms based on the determined search costs, wherein the efficient order sorts the plurality of search terms from a lowest search cost term to a highest search cost term;

performing a first search of a set of data for the lowest search cost term;

performing a second search of a next lowest search cost term, according to the efficient order, only within results of the first search;

searching for each respective remaining term, in the efficient order, only within results of the search performed just prior to the respective remaining search term; and providing the system user with results of the search for the highest search cost term.

2. The method of claim 1, wherein the search cost data indicates numbers of search results for each search term of the plurality of search terms.

3. The method of claim 1, wherein the search cost data indicates at least one resource required to search each respective search term of the plurality of search terms.

4. The method of claim 3, wherein the at least one resource includes an amount of time.

5. The method of claim 3, wherein the at least one resource includes at least one of a data transmission or a processing resource.

6. The method of claim 1, the operations further comprising updating a search cost database based on the performed searches.

7. The method of claim 1, wherein search results are output to a caller.

8. The method of claim 7, wherein the caller is a human.

9. The method of claim 7, wherein the caller is a computer program.

10. The method of claim 1, wherein the first set of data is stored in an internal database of the system.

11. The method of claim 1, wherein the first set of data is stored in a third party database.

12. The method of claim 1, wherein the first set of data is stored in a public database.

13. The method of claim 1, wherein the first set of data is stored in a service provider's database.

14. A system comprising:
one or more processors; and
at least one memory coupled to the one or more processors and storing instructions that, when executed by the one or more processors, cause the system to perform operations comprising:
receiving a search request from a system user;
identifying a plurality of search terms from the search request;
retrieving search cost data indicating a respective search cost for each respective search term of the plurality of search terms based on a plurality of known search terms;
matching each respective search term to a respective one of the plurality of known search terms;
determining, for each respective search term, a search cost of searching the respective search term, based on the matching;
determining an efficient order of searching the plurality of search terms based on the determined search costs, wherein the efficient order sorts the plurality of search terms from a lowest search cost term to a highest search cost term;

performing a first search of a set of data for the lowest search cost term;

performing a second search of a next lowest search cost term, according to the efficient order, only within results of the first search;

searching for each respective remaining term, in the efficient order, only within results of the search performed just prior to the respective remaining search term; and providing the system user with results of the search for the highest search cost term.

15. The system of claim 14, wherein the search cost data indicates numbers of search results for each search term of the plurality of search terms.

16. The system of claim 14, wherein the search cost data indicates at least one resource required to search each respective search term of the plurality of search terms.

17. The system of claim 16, wherein the at least one resource includes an amount of time.

18. The system of claim 16, wherein the at least one resource includes at least one of a data transmission or a processing resource.

19. The system of claim 14, the operations further comprising updating a search cost database based on the performed searches.

20. The system of claim 14, wherein search results are output to a caller.

21. The system of claim 20, wherein the caller is a human.

22. The system of claim 20, wherein the caller is a computer program.

23. The system of claim 14, wherein the first set of data is stored in an internal database of the system.

24. The system of claim 14, wherein the first set of data is stored in a third party database.

25. The system of claim 14, wherein the first set of data is stored in a public database.

26. The system of claim 14, wherein the first set of data is stored in a service provider's database.

27. A non-transitory computer-readable medium storing instructions that, when executed by one or more processors of a system, causes the system to perform operations comprising:
receiving a search request from a system user;
identifying a plurality of search terms from the search request;
retrieving search cost data indicating a respective search cost for each respective search term of the plurality of search terms based on a plurality of known search terms;
matching each respective search term to a respective one of the plurality of known search terms;
determining, for each respective search term, a search cost of searching the respective search term, based on the matching;
determining an efficient order of searching the plurality of search terms based on the determined search costs, wherein the efficient order sorts the plurality of search terms from a lowest search cost term to a highest search cost term;

performing a first search of a set of data for the lowest search cost term;

performing a second search of a next lowest search cost term, according to the efficient order, only within results of the first search;

searching for each respective remaining term, in the efficient order, only within results of the search performed just prior to the respective remaining search term; and providing the system user with results of the search for the highest search cost term.

28. The non-transitory computer-readable medium of claim 27, wherein search results are output to a caller.

29. The non-transitory computer-readable medium of claim 27, wherein the search cost data indicates numbers of search results for each search term of the plurality of search terms.

* * * * *